United States Patent
Vranjes et al.

(10) Patent No.: US 11,442,616 B2
(45) Date of Patent: *Sep. 13, 2022

(54) CONTENT-BASED DIRECTIONAL PLACEMENT APPLICATION LAUNCH

(71) Applicant: Microsoft Technology Licensing, LLC, Redmond, WA (US)

(72) Inventors: Miron Vranjes, Seattle, WA (US); Matthew Isaac Worley, Bellevue, WA (US); Nils Anders Sundelin, Bothell, WA (US); Chaitanya Sareen, Seattle, WA (US); Robert James Jarrett, Seattle, WA (US); Jesse Clay Satterfield, Seattle, WA (US); Alice Steinglass, Bellevue, WA (US); Richie Fang, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/395,410

(22) Filed: Aug. 5, 2021

(65) Prior Publication Data

US 2022/0043552 A1 Feb. 10, 2022

Related U.S. Application Data

(63) Continuation of application No. 16/933,759, filed on Jul. 20, 2020, now Pat. No. 11,112,962, which is a continuation of application No. 13/872,159, filed on Apr. 29, 2013, now Pat. No. 10,754,536.

(51) Int. Cl.
*G06F 3/0488* (2022.01)
*G06F 9/445* (2018.01)

(52) U.S. Cl.
CPC ............ *G06F 3/0488* (2013.01); *G06F 9/445* (2013.01)

(58) Field of Classification Search
CPC .................................................... G06F 3/0488
See application file for complete search history.

(56) References Cited

U.S. PATENT DOCUMENTS

| | | | | |
|---|---|---|---|---|
| 6,002,402 A | * | 12/1999 | Schacher | G06F 3/0481 715/810 |
| 2006/0053384 A1 | * | 3/2006 | La Fetra | G06F 9/445 715/765 |
| 2009/0058821 A1 | * | 3/2009 | Chaudhri | G06F 3/0488 345/173 |

OTHER PUBLICATIONS

"Office Action Issued in European Patent Application No. 13771292. 3", dated Feb. 2, 2022, 4 Pages.

(Continued)

*Primary Examiner* — Roland J Casillas

(57) ABSTRACT

A user can select content on an interface screen and provide an associated directional placement instruction to launch a new application window that displays the selected content or information associated with the selected content. The directional placement instruction may indicate an area of the screen where the user prefers to display the new application window. Responsive to the initiation of the directional placement instruction, a conversion module converts the selected content into a placeable representation of the new application. Responsive to receipt of the directional placement instruction, a window management system presents the new application window in the user interface in a location based on the directional placement instruction.

20 Claims, 6 Drawing Sheets

(56) References Cited

OTHER PUBLICATIONS

"Summons To Attend Oral Proceedings Issued in European Patent Application No. 13771292.3", dated Jul. 5, 2022, 5 Pages.

* cited by examiner

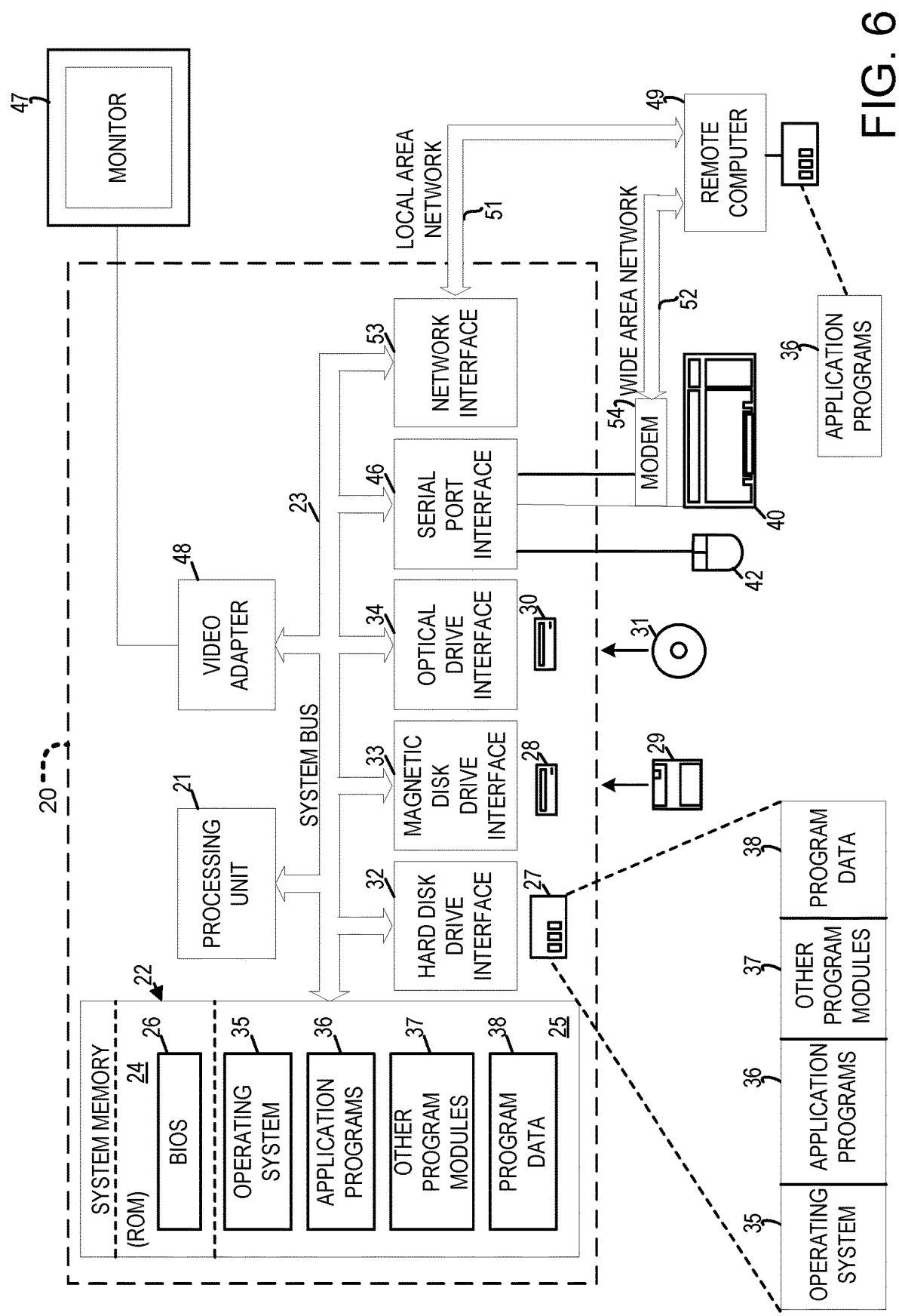

CONTENT-BASED DIRECTIONAL PLACEMENT APPLICATION LAUNCH

CROSS-REFERENCE TO RELATED APPLICATION

This application is a continuation application of and claims priority to U.S. patent application Ser. No. 16/933,759, entitled "Content-Based Directional Placement Application Launch," filed on Jul. 20, 2020, which is a continuation of and claims priority to U.S. Pat. No. 10,754,536, entitled "Content-Based Directional Placement Application Launch," filed on Apr. 29, 2013, the disclosures of which are incorporated herein by reference in their entireties.

BACKGROUND

A computer operating system, including its corresponding user interface, allows a user to launch a new application window for presentation to the user through the user interface. However, the computer operating system does not permit the user to provide input as to the initial placement of the new application window and to designate content of the new application window by selecting associated content visible in an existing application window.

SUMMARY

Implementations described and claimed herein address the foregoing problems by providing for the launch of a new application window responsive to receipt of a selection of content on an interface screen and receipt of an associated directional placement instruction. Responsive to initiation of the directional placement, a conversion module converts the selected content into a placeable representation of an application associated with the selected content. The directional placement instruction may designate an area within the interface screen for display of the new application window. The new application window is a window of the application associated with the selected visible content that displays the selected content or related content. Additionally, the user interface can give cooperative feedback to the user responsive to initiation of the directional placement instruction, such as by highlighting an application window to be replaced, animating the placeable representation of the application, etc.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTION OF THE DRAWINGS

FIG. 6 illustrates an example system that may be useful in implementing the described technology.

DETAILED DESCRIPTION

Launching an application window includes without limitation initially executing the application and switching to a new or hidden application window of an already executing application. In addition, an application window may include without limitation a window of the operating system components, an operating system utility, and a special purpose application program (e.g., a Web browser program, a word processing program, a spreadsheet program).

Figure 1:
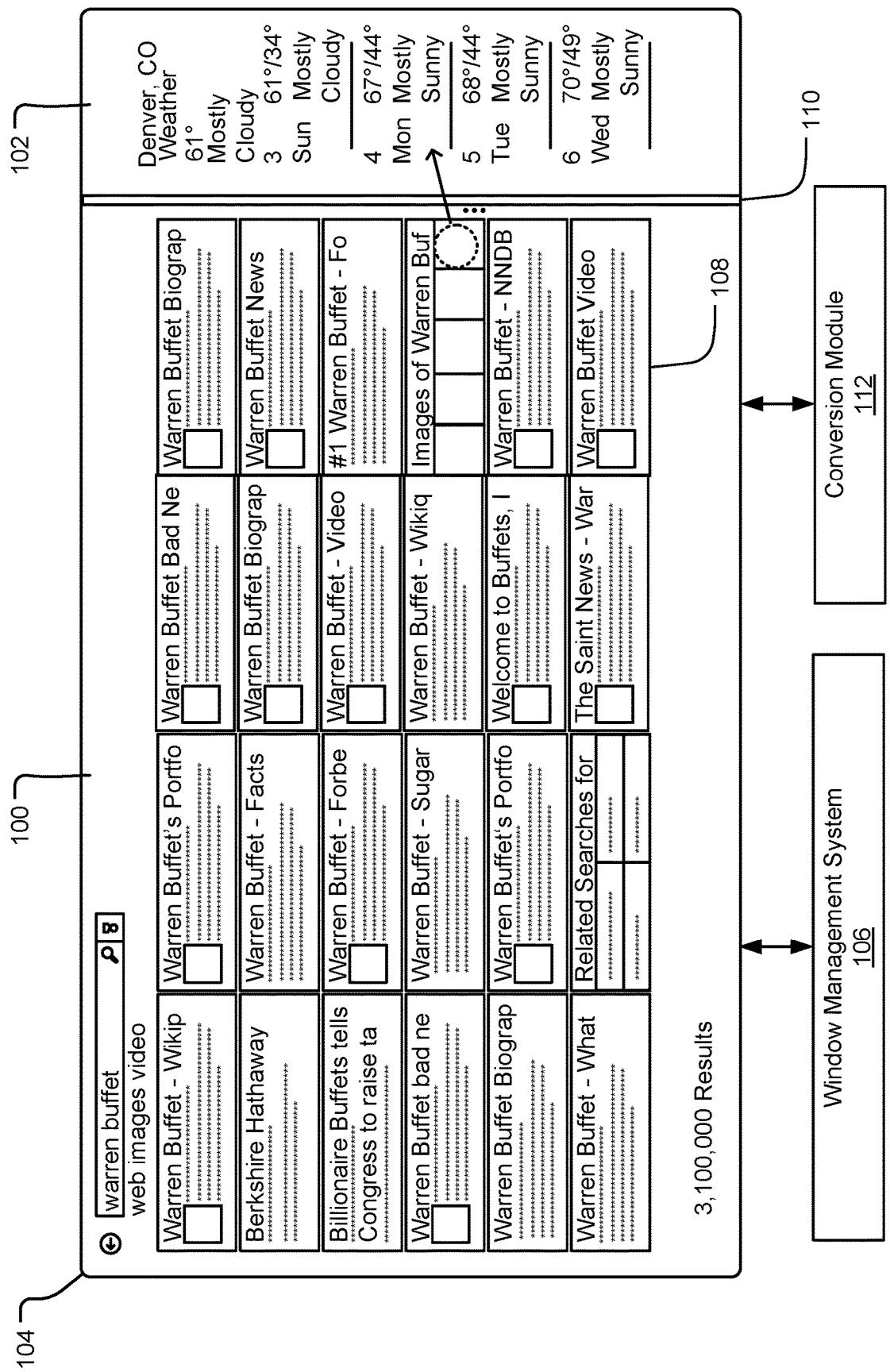
FIG. 1 illustrates two application windows in an example user interface screen supported by a content-based directional placement application launch feature.

FIG. 1 illustrates two application windows 100 and 102 in an example user interface screen 104 supported by a content-based directional placement application launch feature. A window management system 106 is typically a component of an operating system or user interface environment but could also be an independent application. The window management system 106 manages the display, placement, layout, appearance, and other aspects of the application windows 100 and 102, as well as other windows and user interface characteristics and operations. The window management system 106 also communicates with the operating system to launch new applications responsive to user-executed launch commands.

The application window 100 presents a search result window displaying search results from a Web search engine. The individual search results (such as a search result 108) includes representative text and/or one or more images along with a browser navigable link, which can be selected by the user for navigation to a Web site identified by the browser navigable link. The application window 102 presents results from a weather application or Web site, including a 4-day forecast of weather in Denver, Colo. A window boundary control 110 divides the displayed area of the application window 100 and displayed area of the application window 102, in the illustrated case, separating the application windows. In some implementations, the window boundary control 110 may be manipulated by the user to change the size and/or location of one or both windows.

The application windows 100 and 102 are shown in FIG. 1 as being non-overlapping windows. However, the described technology is not limited to non-overlapping windowing environments. For example, in such environments, each application window in an overlapping windowing environment may be bounded by a window boundary control, which can be manipulated by the user to change the location, size, and front-to-back ordering (collectively, "placement") of the potentially overlapping windows (e.g., the z-ordering of the windows). The window management system 106 receives input through the application windows 100 and 102 and through other user interface components (e.g., the keyboard interface, a touch screen interface, a voice interface, and pointing device) and displays the applications windows 102, the window boundary control 110, and other application windows and controls through the user interface screen 104.

In one implementation, a directional placement instruction triggers a launch of an application window via the window management system 106. The directional placement instruction can be initiated by one or more user actions performed in association with content visible on the user interface screen 104 (i.e., visible content). Visible content is content on the user interface screen 104 that is capable of being selected by the user. Examples of visible content include without limitation: images or text displayed in a web browser window (e.g., search results); notification windows that appear on the user interface screen 104 (e.g., a notification related to a currently-executing application); and icons (e.g., a shortcut icon) that appear in a start menu or on a desktop screen of the user interface screen 104. Visible content may also refer to more than one selectable item (e.g., multiple graphics, text blocks, icons, user interface controls, links, combinations thereof, etc.) when such items are selected together.

It should be understood that the launched application window may display different content than the selected content. For example, a task control or description for buying some eggs in a task management application may be selected, dragged, converted into a placeable control, and dropped at a location of the user interface. The window management system 106 may be configured to recognize the content of the selected item to be a task for buying something and therefore launches a shopping application with eggs inserted in the shopping cart. In this scenario, the selected content is a task object or textual description and the content in the launched application window is an e-commerce item placed in an appropriate context (e.g., in the shopping cart).

In one implementation, the user initiates a directional placement instruction by selecting visible content and providing input (e.g., keyboard or touch input) to indicate an intention to launch a new application window associated with the selected visible content.

Responsive to the initiation of the directional placement instruction, a conversion module 112 converts the selected visible content into a placeable representation (not shown) of an application associated with the selected visible content. The conversion module 112 may be a component of an operating system or user interface environment but could also be an independent application The application associated with the selected visible content (i.e., the associated application) is an application that may be used to view, edit, or otherwise utilize the selected visible content or content related to the selected visible content. The user may indicate, via the directional placement instruction (e.g., by dragging the placeable representation), a preference for placement of a launched window of the associated application.

When the user commits to the directional placement instruction (e.g., by taking action such as releasing a mouse, touchscreen, touchpad, or providing keyboard input), the window managements system 106 determines a placement, based on the directional placement instruction, within the user interface with which to display a window of the associated application.

For example, some application windows are characterized by predefined display parameters (e.g., full screen, a left portion of the screen, at least half the screen, etc.). Some predefined characteristics may provide no constraints or some constraints (e.g., a minimum size) but otherwise leave the window placement up to the window management system 106. The directional placement instruction provides the window management system 106 with one or more such constraints for displaying the window of the associated application.

When the window management system 106 determines a placement for the new window of the associated application, the window is launched according to the directional placement instruction. The selected visible content or content associated with the selected visible content is displayed in the launched window.

In FIG. 1, a user initiates a directional placement instruction by selecting a graphic that appears in the search result 108 and dragging (e.g., using a mouse, a touchscreen, or touch pad) the graphic away from an original position in the application window 100 to a position on top of the application window 102. When the conversion module 112 detects that the dragging operation is occurring, the conversion module 112 converts the selected graphic into a placeable representation (not shown) of an application associated with the selected content (e.g., the graphic). Such conversion may or may not visually change the appearance of the selected visible content on the user interface. The user may commit to the directional placement instruction by releasing the dragged, selected visible content over a selected area of the screen (e.g., on the application window 102). In response to the directional placement instruction, the window management system 106 launches a new application window of the application associated with the selected content in the selected area. The new application window displays the selected graphic or content related to the selected graphic.

The following two examples are provided, although other implementations of the described technology are contemplated and described herein. In one example, a user interface may display a notification control relating to an alert indicating a received email message, a received text message, a reminder of an event, etc. The notification control, associated with a notifying application (e.g., an email application, a messaging application, a calendar application), receives input via a selection event (e.g., a PointerDown event, a mouse event, a keyboard event) giving focus to the notification control. If the user moves the selection point (e.g., the Pointer) a predefined distance, the notifying application detects the movement and notifies a component of the window management system that the notification control is receiving a directional instruction. The window management system converts the notification control of the notifying application into a placeable control that can be manipulated by the window management system as described herein, such that an associated application window (e.g., an application window for an email application) can be made visible within the user interface (e.g., being added to the window layout in accordance with the directional placement instruction).

The conversion from the notification control to the placeable control may or may not result in any visual changes to the notification. In one implementation, the notification control visually changes to suggest to the user that it can be placed in a location to launch the associated application window (e.g., from a notification control to an application window or an outline of an application window labeled with the name of the email application). Other visual changes may be employed. In another implementation, the notification control remains unchanged visually but is converted to a placeable control that is managed by the window management system for placement of an associated application window. Various visual and nonvisual conversions may be employed.

In another example, a user can select and drag content (e.g., text, an image, an arbitrary control) from a visible application window to launch another application window associated with the selected content. In this example, the content is associated with metadata that can be passed to the window management system. In this manner, the window management system can use the metadata to identify an appropriate application window to launch in an appropriate context. For example, if the content represents a phone number, once the initiation of the directional placement instructions has been detected, the selected content and associated metadata (e.g., a telephony application identifier) are passed to the window management system. The associated metadata may be closely related to (e.g., tagged to or a component of) the selected content or otherwise provided by the application window containing the selected content. The associated metadata allows the window management system to map the selected content to an appropriate target application for invocation. As a result, the selected content converts to a placeable control associated with an appropriate application window that can be placed within the user interface such that the appropriate application window is launched in the user interface.

Figure 2:
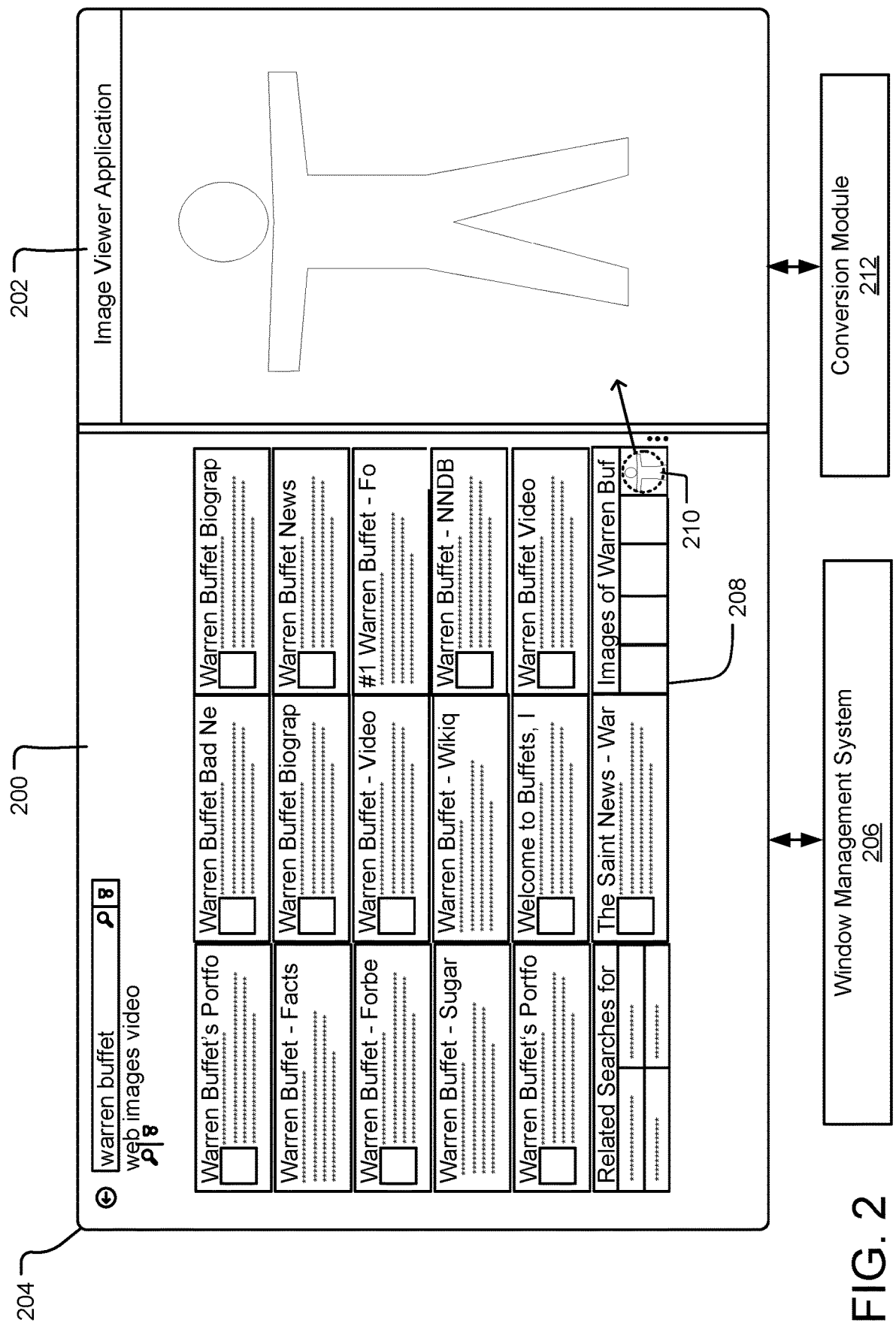
FIG. 2 illustrates two application windows in another example user interface screen supported by a content-based directional placement application launch feature.

FIG. 2 illustrates two application windows 200 and 202 in another example user interface screen 204 supported by a content-based directional placement application launch feature. The application window 200 presents a search result window displaying search results from a Web search engine. The individual search results (such as a search result 208) include representative text and/or one or more images along with a browser navigable link, which can be selected by the user for navigation to a Web site identified by the browser navigable link. The search result 208 includes a number of images including an image 210 that the user wishes to view in an image-viewing application.

To view the image 210 in the image-viewing application, the user initiates a directional placement instruction, such as by selecting and dragging the image 210 using a pointing device, touchscreen, touchpad, etc. When a conversion module 212 recognizes that the user is initiating the directional placement instruction, the conversion module 212 converts the image 210 into a placeable representation (not shown) of the image-viewing application. The user commits to the directional placement instruction by placing the placeable representation of the image-viewing application in a selected area of the interface screen 204 (e.g., by releasing the button on the pointing device or removing his or her finger from the touch screen). In response, the window management system 206 launches a new window 202 of the image-viewing application in the user-selected area that displays the selected image 210.

Figure 3:
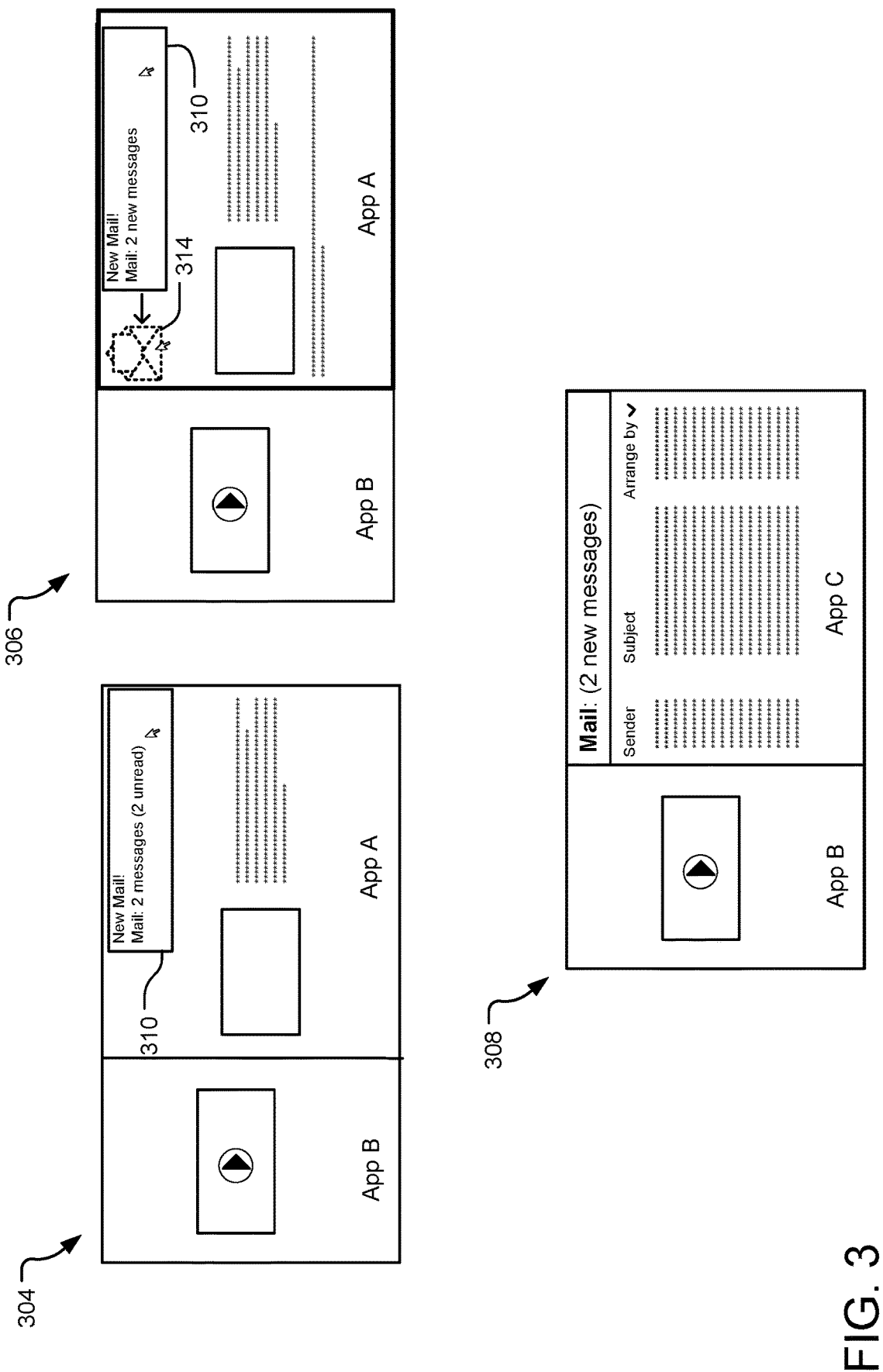
FIG. 3 illustrates an example sequence of user interface operations implementing a content-based directional placement application launch feature.

FIG. 3 illustrates an example sequence of user interface operations implementing a content-based directional placement application launch feature. At 304, a user selects a notification window 310 that has appeared in the top right corner of an open window of an application referred to as App A. A window for another application referred to as App B is open alongside of the window for the App A.

At 306, the user initiates a directional placement instruction by dragging the selected notification window 310 to the left toward the window of App B. Such action indicates to a conversion module (not shown) that the user would like to launch a new application (e.g., an email application) to view information (e.g., an email) associated with the selected notification window 310.

Responsive to the user's initiation of the directional placement instruction, the conversion module converts the selected notification window 310 into a placeable representation 314 (e.g., an envelope graphic) of an application associated with the selected notification (e.g., default mail application), as shown at 306. In one implementation, the selected notification window 310 is not visually distinguishable from the placeable representation 314 of the application. Thus, the user may not receive an indication that such conversion has occurred. However, in other implementations (such as that shown in FIG. 3) the placeable representation 314 of the application is visually distinguishable from the selected visible content. In other implementations, other visual effects (e.g., changes in size, color, transparency, use of iconic graphics, etc.) are utilized to inform the user that such conversion has occurred. For example, where multiple homogeneous visual content items (e.g., Excel files) are selected together, the placeable representation 314 may be an icon representative of the file type (e.g., the Excel file iconography) with a numeral overlay indicating the number of files selected. Alternatively, where multiple heterogeneous visual content items are selected together, the placeable representation 314 may be a generic file icon.

In yet another implementation, the application windows may be launched in response to the initiation of the directional placement instruction, such that the placeable representation of the application is the launched application window itself, which is placed according to the directional placement instruction. In such an implementation, the launched application window, in its placeable form, may be a full size live version of the launched application window, a snapshot of the launched application window, or a miniaturized (live or snapshot) version of the launched application window.

Responsive to the initiation of the directional placement instruction, the window management system highlights the boundary of the application window for App A (as shown at 306) to indicate that it is interpreting the dragging instruction as an instruction to replace the application window for App A with a window of the application associated with the selected notification window 310 (e.g., the mail application). If the user commits to this instruction (e.g., by releasing the button on the pointing device or removing his or her finger from the touch screen) while the application window for App A is highlighted, the window management system removes the placeable representation 314 of the application from the user interface and replaces the application window for the App A with a newly launched application window of the mail application (e.g., a window for an App C), as shown at 308.

Figure 4:
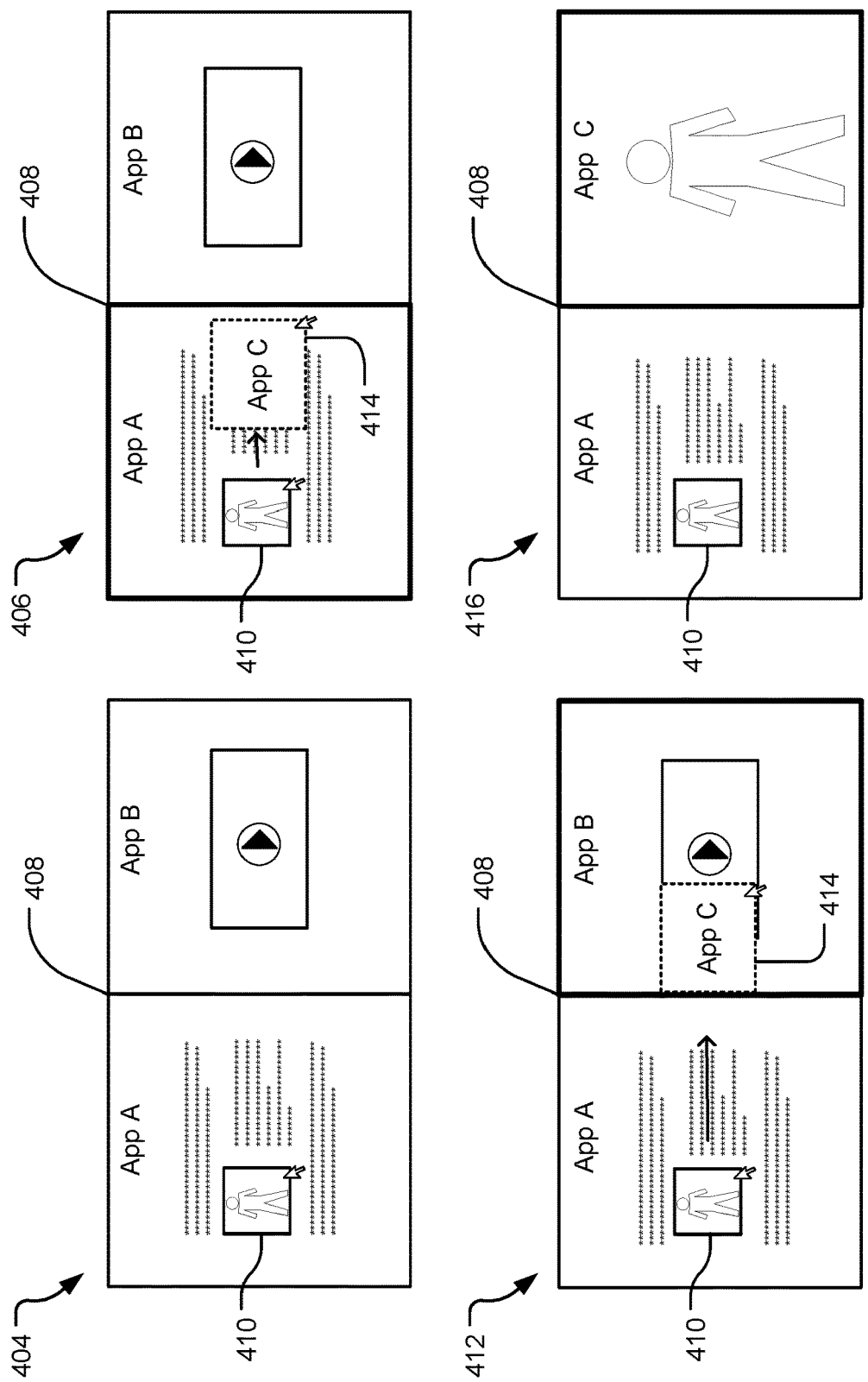
FIG. 4 illustrates another example sequence of user interface operations implementing a content-based directional placement application launch feature.

FIG. 4 illustrates another example sequence of user interface operations implementing a content-based directional placement application launch feature. At 404, the user selects visible content 410 (e.g., an image) that appears in an open window of an application referred to as App A. A window for another application referred to as App B is open alongside of the window for the App A. The applications App A and App B are separated by a window boundary control 408.

As shown at 404, the user initiates a directional placement instruction by dragging the selected visible content 410 to the right toward the window of App B. Such action indicates to a conversion module (not shown) that the user would like to launch a new application to view, edit, or otherwise utilize the selected visible content or information associated with the selected visible content.

Responsive to the user's initiation of the directional placement instruction, the conversion module converts the selected visible content 410 into a placeable representation 414 of an application associated with the selected visible content 410 (e.g., a representation of an application App C), as shown at 406. As the user is dragging the selected visible content 410, the selected visible content 410 transforms into a graphical representation of the App C so that the user is aware that a window management system is awaiting instruction.

The application associated with the selected visible content (i.e., the associated application) (e.g., App C) is an application that the window management system associates with a recognized format of the selected visible content. In some cases, the associated application is a default application associated with a recognized file format of the selected visible content that may be used to view, edit or otherwise utilize the selected visible content. For example, the window management system may associate a photo viewing or editing application with selected visible content that is a recognized photo format (e.g., .jpg, .tiff, .png, gif, etc.). Alternatively, the window management system may associate a word editing application with selected visible content that is textual in nature. Further, the window management system may associate a video viewing application with selected visible content that is a recognized video format (e.g., .mpg. .wmv, .mp4, .mov, .swf, etc.).

Responsive to the initiation of the directional placement instruction, the window management system highlights the boundary of the application window for App A, as shown at 406, to indicate that it is interpreting the instruction as an instruction to replace the application window for App A with the application window for App C. If the user commits to this instruction (e.g., by releasing the button on the pointing device or removing his or her finger from the touch screen) while the application window for App A is highlighted, the window management system removes the placeable representation 414 of the associated application from the user interface and replaces the application window for the App A with the newly launched application window for the App C.

However, as shown at 412, the user continues to drag the placeable representation 414 of the associated application into the window for App B. Accordingly, the window management system removes the highlight of the boundary of the application window for App A and highlights the boundary of the application window for App B to indicate that it is interpreting the instruction as an instruction to replace the application window for App B with the application window for App C. If the user commits to this instruction (e.g., by releasing the button on the pointing device or removing his or her finger from the touch screen) while the application window for App B is highlighted, the window management system removes the placeable representation 414 of the associated application from the user interface and replaces the application window for the App B with the newly launched application window for the App C, as shown at 416.

While the previous description presents the newly launched application window for App C replacing the application window for App B, another implementation may result in the newly launched application window for App C being inserted between the applications windows for App A and B or inserted at an edge of the user interface (e.g., top edge, bottom edge, right edge, left edge).

The newly launched application window of App C includes the selected visible content 410 (e.g., the photo) or content associated with the selected visible content. The content of the newly launched application window of App C may be directly associated with the selected visible content. For example, if the selected visible content is a notification, then information related to the notification may be displayed in the newly launched application window. Alternatively, content of the newly launched application window of App C may be indirectly related to the selected visible content. For example, if the selected visible content is an application shortcut, the newly launched application window may be a default window of the related application. The content of the newly launched application window of App C may depend on one or both of the selected content and the context of the directional placement instructions (e.g., a drag to the top of the user interface may result in the presentation of different content than a drag to the right of the user interface). In yet another implementation, the application window from which the content is selected may suggest a handler for the selected content, which can launch an application window deemed appropriate by the handler.

Although App C is illustrated as an application that is different from App A and App B, the application launched responsive to the directional placement instruction may also be a new window of an already executing application (e.g., a new window of App A or App B).

While dragging (whether by touch, by a point device, etc.) is presented as an example of a directional placement instruction, other such instructions are contemplated. For example, a user may issue a directional placement instruction by selecting (whether by touch, by a point device, by keyboard, etc.) the application window he or she wishes to be replaced.

In circumstances in which the window management system is unable to interpret the directional placement instruction, the window management system may present a placement prompt (not shown) to the user via the user interface screen. The placement prompt may solicit input from the user to assist the window management system in launching the application window within the layout of the user interface. The user may provide input to the placement prompt in various ways. For example, the user may select a portion of the prompt that overlays the application window he or she wishes to be replaced. In another example, the user can gesture to or from a boundary of the application screen to indicate the desired placement.

Figure 5:
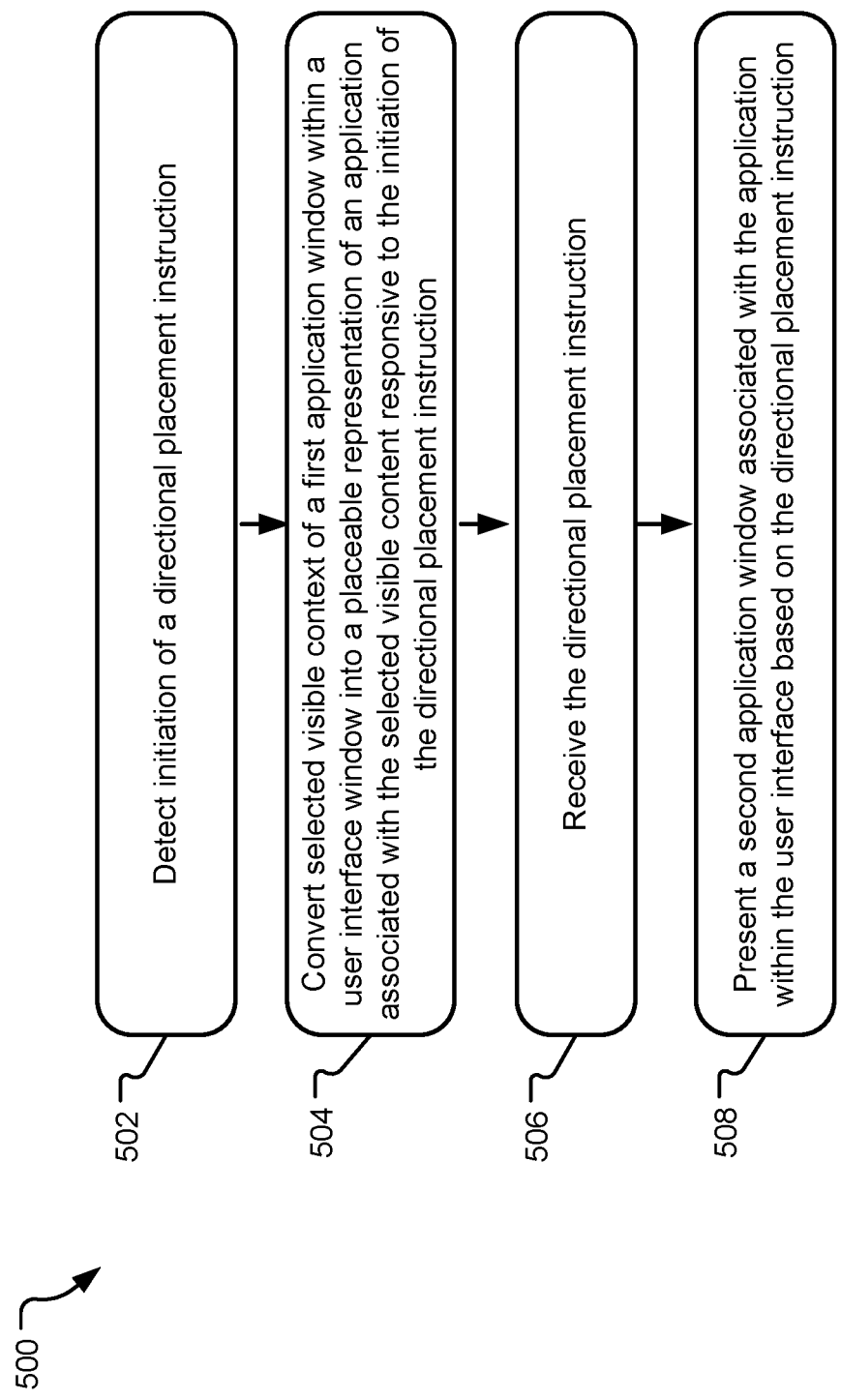
FIG. 5 illustrates example operations for implementing a content-based directional placement application launch feature.

FIG. 5 illustrates example operations 500 for implementing a content-based directional placement application launch feature. A detection operation 502 detects an action indicating that a directional placement instruction is being initiated. The action detected is associated with content visible to a user in a first application window of a user interface screen. The detection operation 502 may be responsive to a user's selection of such visible content and/or additional user input (e.g., keyboard input, touchscreen manipulation of the selected visible content, etc.).

In response to the detection operation 502, a conversion operation 504 converts the selected visible content of the first application window into a placeable representation of an application (i.e., the associated application) that is associated with the selected visible content. The placeable representation of the associated application may or may not be visually distinguishable from the selected visible content on the user interface screen. The associated application is an application that may be used to view, edit or otherwise utilize the selected visible content or content associated with the selected visible content.

Another receiving operation 506 receives the directional placement instruction, which includes one or more constraints indicating a placement within the user interface screen with which to display a new window of the application associated with the selected visible context. A presenting operation 508 presents a second application window on the user interface screen based on the directional placement instruction. The second application window is a window of the associated application that displays the selected visible content or content associated with the selected visible content.

FIG. 6 illustrates an example system that may be useful in implementing the described technology. The example hardware and operating environment of FIG. 6 for implementing the described technology includes a computing device, such as general purpose computing device in the form of a gaming console or computer 20, a mobile telephone, a personal data assistant (PDA), a set top box, or other type of computing device. In the implementation of FIG. 6, for example, the computer 20 includes a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the implementations are not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated tangible computer-readable media provide nonvolatile storage of computer-readable instructions, data structures, program modules and other data for the computer 20. It should be appreciated by those skilled in the art that any type of tangible computer-readable media which can store data that is accessible by a computer, such as magnetic cassettes, flash memory cards, digital video disks, random access memories (RAMs), read only memories (ROMs), and the like, may be used in the example operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone (e.g., for voice input), a camera (e.g., for a natural user interface (NUI)), a joystick, a game pad, a satellite dish, a scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the implementations are not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 6. The logical connections depicted in FIG. 6 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are example and other means of and communications devices for establishing a communications link between the computers may be used.

In an example implementation, software or firmware instructions and data for providing a window management system, a content-based directional placement application launch feature, a conversion module, window placement parameters and other data may be stored in memory 22 and/or storage devices 29 or 31 and processed by the processing unit 21. The window placement parameters and other data may be stored in memory 22 and/or storage devices 29 or 31 as persistent datastores.

Some embodiments may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary implementations. Since many implementations can be made without departing from the spirit and scope of the claimed invention, the claims hereinafter appended define the invention. Furthermore, structural features of the different examples may be combined in yet another implementation without departing from the recited claims.

What is claimed is:

1. A method comprising:
    detecting a selection of visible content of a first application window within a user interface;
    detecting an initiation of a directional placement instruction regarding the selected visible content of the first application window within the user interface;
    converting the selected visible content of the first application window within the user interface into a placeable control associated with the selected visible content responsive to the initiation of the directional placement instruction;
    detecting completion of the directional placement instruction after conversion of the selected visible content of the first application window within the user interface into the placeable control; and
    launching a second application window associated with the selected visible content, the launching being triggered by the detection of the completion of the directional placement instruction.

2. The method of claim 1, wherein the directional placement instruction comprises dragging the selected visible content to a third application window.

3. The method of claim 2, wherein an application launched responsive to the directional placement instruction comprises a new window of an already executing application.

4. The method of claim 3, wherein the third application window comprises a window of the already executing application.

5. The method of claim 2, wherein the first application window and the third application window are separated by a window boundary control.

6. The method of claim 2, wherein launching the second application window comprises replacing the third application window with the second application window.

7. The method of claim 1, wherein the placeable control is visually distinguishable from the selected visible content.

8. The method of claim 7, wherein the placeable control is visually distinguishable from the selected visible content based on size.

9. The method of claim 7, wherein the placeable control is visually distinguishable from the selected visible content based on graphics.

10. A system comprising:
    a processor; and
    a computer-readable medium storing instructions that are operative upon execution by the processor to:
        detect a selection of visible content of a first application window within a user interface;
        detect an initiation of a directional placement instruction regarding the selected visible content of the first application window within the user interface;
        convert the selected visible content of the first application window within the user interface into a placeable control associated with the selected visible content responsive to the initiation of the directional placement instruction;
        detect completion of the directional placement instruction after conversion of the selected visible content of the first application window within the user interface into the placeable control; and
        launch a second application window associated with the selected visible content, the launching being triggered by the detection of the completion of the directional placement instruction.

11. The system of claim 10, wherein the directional placement instruction comprises dragging the selected visible content to a third application window.

12. The system of claim 11, wherein an application launched responsive to the directional placement instruction comprises a new window of an already executing application.

13. The system of claim 12, wherein the third application window comprises a window of the already executing application.

14. The system of claim 11, wherein launching the second application window comprises replacing the third application window with the second application window.

15. The system of claim 10, wherein the placeable control is visually distinguishable from the selected visible content based on size and/or graphics.

16. One or more computer storage devices having computer-executable instructions stored thereon, which, on execution by a computer, cause the computer to perform operations comprising:
    detecting a selection of visible content of a first application window within a user interface;
    detecting an initiation of a directional placement instruction regarding the selected visible content of the first application window within the user interface;
    converting the selected visible content of the first application window within the user interface into a placeable control associated with the selected visible content responsive to the initiation of the directional placement instruction;
    detecting completion of the directional placement instruction after conversion of the selected visible content of the first application window within the user interface into the placeable control; and launching a second application window associated with the selected visible content, the launching being triggered by the detection of the completion of the directional placement instruction.

17. The one or more computer storage devices of claim 16, wherein the directional placement instruction comprises dragging the selected visible content to a third application window.

18. The one or more computer storage devices of claim 17, wherein an application launched responsive to the directional placement instruction comprises a new window of an already executing application.

19. The one or more computer storage devices of claim 18, wherein the third application window comprises a window of the already executing application.

20. The one or more computer storage devices of claim 16, wherein the placeable control is visually distinguishable from the selected visible content based on size and/or graphics.

* * * * *